April 29, 1952     Z. WIESELTIER     2,595,114
LAWN AND CROP SPRINKLER
Filed April 8, 1948
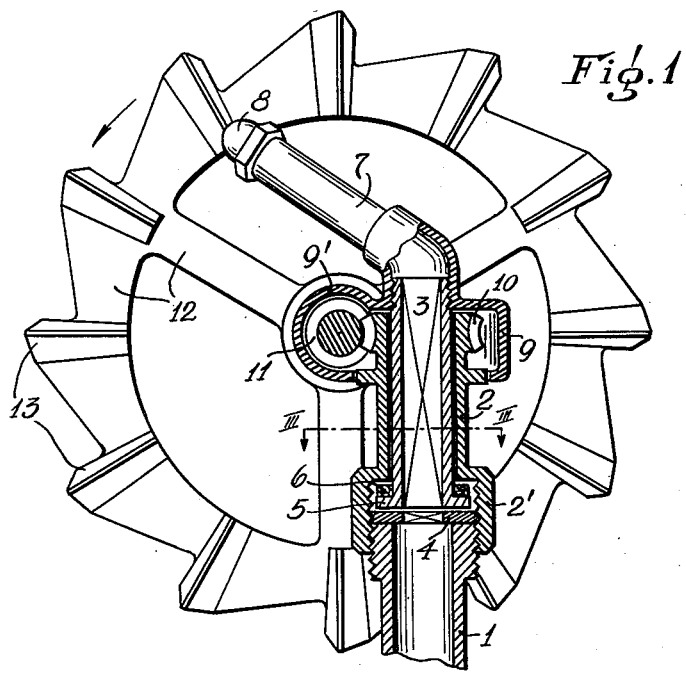
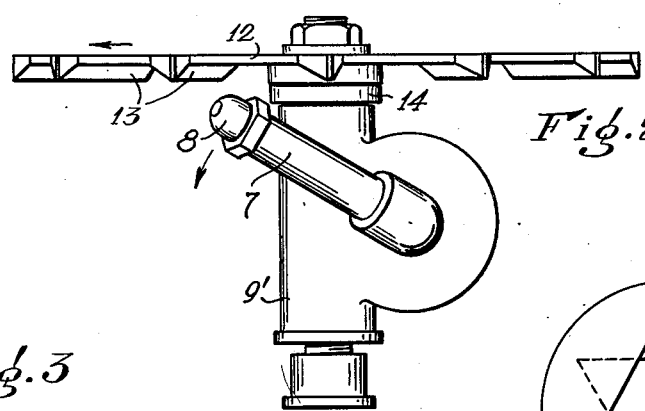
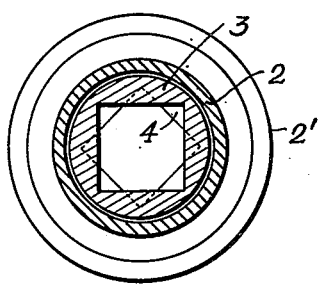
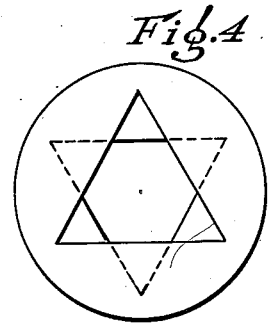
Zeev Wieseltier
INVENTOR.
BY 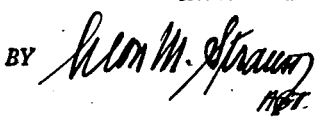

Patented Apr. 29, 1952

2,595,114

UNITED STATES PATENT OFFICE 2,595,114

LAWN AND CROP SPRINKLER

Zeev Wieseltier, Tel Aviv, Palestine

Application April 8, 1948, Serial No. 19,709

2 Claims. (Cl. 299—18)

The invention relates to lawn or crop sprinklers of the type comprising a vertical supply pipe or riser and a head revolving thereon and distributing by means of a nozzle or nozzles the water under pressure over the area to be irrigated. With sprinklers of this kind the area watered is as a rule a circular one. For areas of a different configuration devices have been constructed to adapt the sprinkler to the different shape of the areas by varying the range of throw during each rotation of the sprinkler.

The object of the present invention is to provide such an adapting device which, however, excels by its simplicity of construction and low cost of manufacture.

The main feature of the invention resides in the provision of two superposed contacting pierced members arranged in the water duct leading to the nozzle, one of the members being stationary, while the other is movable and covers periodically during each rotation parts of its own opening and of that of the stationary member. By this restriction of the passage of the flow of the water, the friction encountered by the latter is periodically increased and consequently the length of the throw diminished. The shape of the openings of these members will be chosen in accordance with the desired shape of the irrigation surface.

Other features will be apparent from the following description and annexed drawings in which:

Fig. 1 is an axial section of the device;

Fig. 2 a plan view thereof;

Fig. 3 is a cross section on line III—III of Fig. 1; and

Fig. 4 is a diagram of a different possible shape of the openings in the cooperating members.

Adverting first to Figs. 1 to 3, in the drawing the numeral 1 designates the usual vertical supply pipe or riser. On the upper end of the riser is screwed the widened part 2' of a head 2 after having inserted in this head a short pipe 3 with a quadrangular bore and interposed a disc 4 between the upper end of the riser 1 and the lower end of the short pipe 3. Disc 4 has a central quadrangular bore similar to that in pipe 3. The lower end of the latter has a collar 5 abutting against an interior shoulder 6 of the head 2. Disc 4 is preferably screwed into the widened part 2', so as to contact, or nearly so, with the lower end of the short pipe 3. On the upper end of pipe 3 is screwed an inclined pipe 7 into the free end of which is screwed a nozzle 8. Integral with the nozzle-pipe 7 is a housing 9 enclosing a worm-wheel 10 fixed on the upper end of the head 2 and a worm 11. Worm 11 is journalled in the housing 9 and carries on an outer end a wheel 12 provided with ribs 13 against which the water jet partially strikes during each revolution of the sprinkler. Since the worm-wheel is stationary, the worm with wheel 12 thereon will wander around the worm-wheel 10. The strength of the impact of the water jet on wheel 12 can be controlled by inserting washers 14 between journal 9' and wheel 12, thus changing the distance of the latter from nozzle 8.

In Figs. 1 to 3 it is assumed that the bore of pipe 3 and the opening of disc 4 are square. The area of free water passage is greatest when said bore and opening lie exactly upon each other, and is smallest when they are turned against each other for forty-five degrees, as indicated in Fig. 3. This change of size of the water passage happens four times during each full rotation of pipe 3. The friction encountered by the water stream in the passage of smaller size being greater than that in the greater passage, the range of the throw will be smaller with the smaller passage and greater with the greater passage, thus resulting in an irrigated area of a square or nearly square shape. With three pointed bores or openings according to Fig. 4 triangular irrigated areas will be obtained.

Some constructional changes may be made without departing from the spirit of the invention. So for instance an insert in the upper end of the riser with a hole of a desired shape may be used instead of the disc 4, which, however, is to be preferred owing to its easy interchangeability. When disc 4 is removed the irrigated area becomes again a circular one, notwithstanding the bore in pipe 3 remaining square.

For the sake of clarity I would like to add that with the restriction of the passage also the quantity of the delivered water is diminished. Since this reduction of the quantity coincides with the reduction of the length of the throw, a more uniform distribution of the water is obtained.

What I claim is:

1. In a lawn and crop sprinkler of the kind referred to having a vertical stationary feeding pipe, an inclined nozzle pipe rotary about the axis of the feeding pipe, and two superposed centrally pierced members forming a passage from the feeding pipe, one member being connected with the feeding pipe and the other with the rotary nozzle pipe, the openings of these members being of symmetrical noncircular shape and disposed with their central holes in line with the feeding pipe, and means for driving the nozzle pipe and those members upon each other, such means including a worm gear determining the speed of rotation of the nozzle pipe.

2. In a lawn and crop sprinkler of the kind referred to having a vertical stationary feeding pipe and an inclined nozzle pipe rotary about the axis of the feeding pipe, and two superposed centrally pierced members forming a passage from the feeding pipe, one member being removably connected with the feeding pipe and the other with the rotary nozzle pipe, the openings of these members being of symmetrical noncircular shape and disposed with their central holes in line with the feeding pipe, means for driving the nozzle pipe and those members upon each other, such means including a worm gear determining the speed of rotation of the nozzle pipe, and a head screwed on the stationary pipe and carrying the driving means, so as to allow access to the removable stationary pierced member.

ZEEV WIESELTIER.

REFERENCES CITED

The following references are of record in the file of this patent:

UNITED STATES PATENTS

| Number | Name | Date |
| --- | --- | --- |
| 1,089,179 | Zeyssolff | Mar. 3, 1914 |
| 1,297,818 | Fawkes | Mar. 18, 1919 |
| 1,716,015 | Tuthill | June 4, 1929 |
| 1,726,986 | Horten | Sept. 3, 1929 |
| 2,002,178 | Henry | May 21, 1935 |
| 2,376,007 | Quigley | May 15, 1945 |
| 2,461,768 | Porter | Feb. 15, 1949 |

FOREIGN PATENTS

| Number | Country | Date |
| --- | --- | --- |
| 527,815 | Germany | June 22, 1931 |